(12) United States Patent
Yasukawa (10) Patent No.: US 6,437,786 B1
(45) Date of Patent: Aug. 20, 2002

(54) METHOD OF REPRODUCING IMAGE DATA IN NETWORK PROJECTOR SYSTEM, AND NETWORK PROJECTOR SYSTEM

(75) Inventor: Masaaki Yasukawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/342,219

(22) Filed: Jun. 29, 1999

(30) Foreign Application Priority Data

Jul. 2, 1998 (JP) .......................................... 10-187945

(51) Int. Cl.⁷ .............................................. G06T 15/70
(52) U.S. Cl. ...................... 345/474; 345/473; 345/475; 345/501
(58) Field of Search ................................ 345/501, 473, 345/474, 475

(56) References Cited

U.S. PATENT DOCUMENTS 5,561,815 A * 10/1996 Takata et al. ................. 710/13
5,926,609 A * 7/1999 Shikakura et al. ............ 386/11
5,933,549 A * 8/1999 Ide et al. ..................... 382/309

OTHER PUBLICATIONS

High Resolution LC Video Projector by Kenji Ymauchi et al (IEEE transaction on Consumer Electronics, vol. 36, No. 3; Aug. 1990).*
Special Image Processing By A Multi–Channel Camera by Tominaga et al IEEE 1999.*

* cited by examiner

Primary Examiner—Mark Zimmerman
Assistant Examiner—Mackly Monestime
(74) Attorney, Agent, or Firm—Oliff & Berridge, PLC (57) ABSTRACT

The invention provides a method of reproducing image data in a network projector system, and a network projector system, which can conveniently process image data that includes moving pictures at low cost and display images through a projector. A network projector system of this invention is structured by servers, a projector, and a network which connects the servers and the projector. While deleting unnecessary data, the projector downloads parts of image data to be displayed and an application from specified servers, processes the image data, and forms and displays an image.

18 Claims, 8 Drawing Sheets

METHOD OF REPRODUCING IMAGE DATA IN NETWORK PROJECTOR SYSTEM, AND NETWORK PROJECTOR SYSTEM

BACKGROUND OF THE INVENTION

1. Field of Invention

This invention relates to the reproduction by a projector of image data, which includes digitized moving pictures, such as animation, video images and the like, and still pictures, such as text, charts, and photographs and the like. In particular, this invention relates to a method of reproducing image data in a network projector system, which is connected to a server computer through a computer network, and which can effectively reproduce image data by a projector. This invention also relates to such a network projector system.

2. Description of Related Art

Projectors are often used during presentations and meetings to display presentation materials or the like. In particular, recently, materials for presentation have typically been created as image data by a personal computer (hereafter referred to as "PC"). The image data which has been created can be easily reproduced by a PC.

Therefore, recently, a method has been performed wherein a PC is connected to a projector, the image data which is created in advance is reproduced by the PC, and the reproduced image is displayed by the projector. According to this method, a plurality of image data, which have been created by the PC, can be copied onto an external recording medium, such as a floppy disk (hereinafter referred to as "FD"), and the image data of the same material can be used in a plurality of locations.

Figure 8:
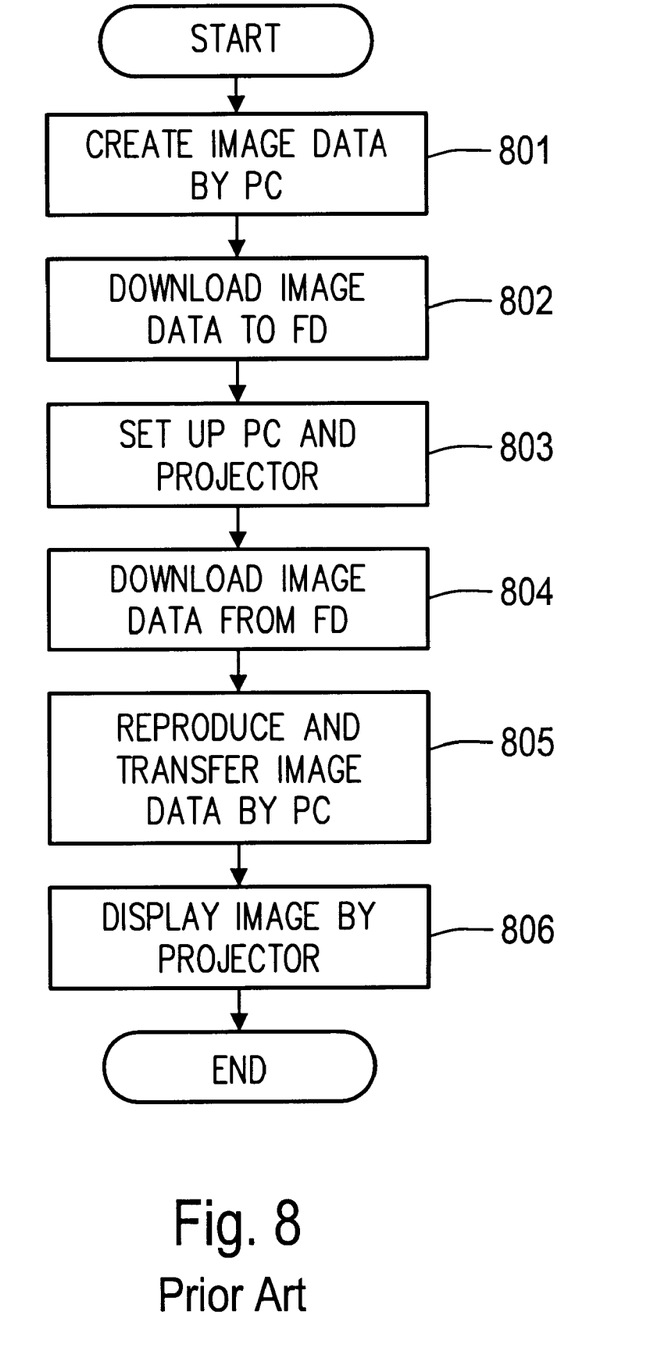
FIG. 8 is a flowchart showing one example of a method of displaying an image by a conventional projector.

FIG. 8 is a flowchart showing one example of a method of displaying an image by a conventional projector. In FIG. 8, when image data is created and displayed by a projector, the presentation material or the like is initially digitized and processed by a PC that is provided for image data creation, and the image data is created and saved onto a recording medium, such as a hard disk (hereafter referred to as "HD") or the like of the PC (801). When a presentation or the like is to be given, the image data, which has been saved in the HD or the like of the PC, is downloaded to an external recording medium, such as a FD (802).

At a location where the presentation is to be given, a PC, which is provided for reproduction and can reproduce the image data, is prepared (set up), and a projector is connected to this PC (803). Next, the PC, which is provided for reproduction, downloads the image data from the external recording medium, such as an FD, to its HD (804). The PC, which is provided for reproduction, appropriately reproduces and processes the image data which has been downloaded, and the image is transferred to the projector (805). The projector displays the image, which has been transferred from the PC, on a display device, such as a large screen (806).

Thus, in the method of displaying an image by a conventional projector, the presentation material or the like is created as image data by a PC that is provided for image data creation, the image data is reproduced by a PC that is provided for reproduction at the presentation location, and the image is displayed by a projector which is connected to the PC that is provided for reproduction.

However, in accordance with this method of displaying an image by a conventional projector, a PC used for reproduction of the image data needs to be prepared at the presentation location (meeting halls, meeting rooms, or the like). In particular, a reproduction application which can reproduce image data, which is created in advance, needs to be provided for the PC that is provided for reproduction. This reproduction application depends upon an application which has created image data. Furthermore, recently, there are various creation applications which create image data, and many different people create image data using various software. Because of this, the problem arises that appropriate reproduction applications are not available for reproduction of image data in a PC which is prepared at a presentation location. Thus, the image data which has been prepared cannot be reproduced by the PC at the presentation location, and an image cannot be displayed by the projector.

Furthermore, it takes time to set up both the PC and the projector. Thus, the problem arises that at a location where a projector and PC cannot be prepared in advance, the method of display is limited to a method that does not use a projector.

Furthermore, it is necessary to bring an FD or the like, which includes recorded image data, to the meeting location. Thus, the problem arises that necessary FDs can be forgotten when a plurality of FDs exist.

Furthermore, when the most common type of FD is used as the external recording medium which records and carries image data, because its recordable data capacity is limited, the problem arises that it is difficult to reproduce and display image data with moving pictures with a large capacity requirement.

In addition, when the image data, which has been created by a PC, is displayed by a projector, if a PC is prepared for every meeting room of a certain company, the problem arises that the cost of the presentations is high because PCs can be expensive.

Therefore, an object of this invention is to provide a method of reproducing image data in a network projector system, and a network projector system, which can conveniently process image data, that includes moving pictures, at low cost and display images by a projector without being restricted by the specifications and environment of the PC.

SUMMARY OF THE INVENTION

In order to solve the problems of the conventional art, a method of reproducing image data, in accordance with a first embodiment of this invention, is a method of reproducing image data in a network projector system that has at least one server connected to a network, and at least one projector connected to the at least one server through the network. The method comprises the steps of:

(a) preparing data that includes image data of an image to be reproduced by the at least one projector and image controlling data at the at least one server, (b) establishing communication between any projector of the at least one projector and at least one specified server of the at least one server through the network, (c) transferring the data that includes the image data and the image controlling data from the at least one specified server with which communication has been established to the projector, wherein processing performed, in the projector which has received the data which has been transferred, comprises the steps of:

(d) determining image data necessary for the image to be displayed based upon the image controlling data, (e) checking whether the necessary image data is stored on a memory medium, (f) determining whether there is sufficient empty space available in the memory medium to store the necessary image data if the necessary image data is not stored in the memory medium, (g) detecting data that is unnecessary for the image to be displayed, and deleting the unnecessary data from the memory medium when the empty space in the memory medium is insufficient to store the necessary image data, (h) receiving the necessary image data from the specified server, (i) storing the image data which has been received in the memory medium, (j) processing the image data which has been stored and forming an image, and (k) displaying the image which has been formed.

Furthermore, in order to solve the problems of the conventional art, a method of reproducing image data, in accordance with a second embodiment of this invention, is a method of reproducing image data in a network projector system that has at least one server connected to a network, and at least one projector connected to the at least one server through the network. The method comprises the steps of:

(a) preparing data that includes image data of an image to be reproduced by the at least one projector and image controlling data at the at least one server, (b) establishing communication between any projector of the at least one projector and at least one specified server of the at least one server through the network, (c) transferring the data that includes the image data and the image controlling data from the at least one specified server with which communication has been established to the projector, wherein processing performed in the projector which has received the data which has been transferred, comprises the steps of:

(d) determining image data necessary for the image to be displayed based upon the image controlling data, (e) checking whether the necessary image data is stored on a memory medium, (f) determining whether there is sufficient empty space available in the memory medium to store the necessary image data if the necessary image data is not stored on the memory medium, (g) detecting data that is unnecessary for the image to be displayed, and deleting the unnecessary data from the memory medium when the empty space in the memory medium is sufficient to store the necessary image data, (h) receiving the necessary image data from the specified server, (i) storing the image data which has been received in the memory medium, (j) processing the image data which has been stored and forming an image, (k) displaying the image which has been formed, (l) inputting an event in connection with the image which has been displayed, (m) generating a script according to the event which has been input, (n) processing the script which has been generated, and (o) controlling the processing of the image data according to the result of the processing of the script.

Furthermore, in accordance with the method of reproducing image data in a network projector system of the second embodiment of this invention, it is also acceptable to include a script into an image displayed in step (k), and input an event in connection with the script in step (l).

By preparing image data at a server, connecting a projector and a server to a network, processing the image data with the projector, and displaying an image, a PC is not needed at a meeting place, and the image can be easily formed from the image data and displayed without being restricted by the environment. Furthermore, because it is possible to check whether the image data to be reproduced is stored, and to delete unnecessary data from the memory medium, the image data can be downloaded from a server according to the memory capacity, and the memory capacity can be kept small.

In accordance with the method of reproducing image data in a network projector system of the first and second embodiments of the invention described above, the processing of steps (d) through (i) can be performed for an image to be displayed next, while steps (j) and (k) are being performed.

By downloading the image data from a server and reproducing it while the image is being displayed, it is possible to effectively perform smooth processing without interrupting the display of the image.

In accordance with the method of reproducing image data in a network projector system of the first and second embodiments of this invention described above, step (c) can transfer data, including image data, image controlling data, and an image processing application, from a specified server, among the servers with which communication has been established, to the projector, and step (j) can process the image data by the image processing application and form an image.

If the image processing application is prepared at a server, and the image processing application is read along with the image data from a server, it is not necessary to separately provide an application which processes the image data.

Additionally, the image data which is received from the server in steps (c) and (h) can include at least one of still picture data, sound data, digital video data, script data, and text data. Furthermore, step (j) can include a step which processes digital video data and forms an image, and a step which processes image data other than digital video data and forms an image.

Moving pictures and still pictures can be individually processed according to the type of image data, and formation and display of an image can be effectively performed.

Furthermore, in order to solve the above-mentioned problems of the conventional art, a method of reproducing image data, in accordance with a third embodiment of this invention, is a method of reproducing image data in a network projector system that has at least one server connected to a network, and at least one projector connected to the at least one server through the network. The method comprises the steps of:

(a) preparing data that includes image data of an image to be reproduced by the at least one projector, image controlling data, and an image processing application at the at least one server, (b) establishing communication between any projector of the at least one projector and at least one specified server of the at least one server through the network, (c) designating, from the projector, an image to be displayed to the server with which communication has been established, (d) determining image data, which is necessary for the image, which has been designated from the projector at the server with which communication has been established, based upon the image controlling data, (e) processing the image data which has been determined, by the image processing application of the server with which communication has been established, and forming the image, (f) transferring a reproduced image to the projector from the server with which communication has been established, (g) determining whether there is sufficient empty space available in a memory medium of the projector to store the image, (h) detecting unnecessary data and deleting the unnecessary data from the memory medium when the vacant area on the memory medium is insufficient to store the image, (i) storing the image which has been transferred from the server with which communication has been established in the memory medium, (j) displaying the image which has been stored by the projector, (k) inputting an event from the projector in connection with the image which has been displayed, (l) generating a script according to the event which has been input from the projector, and transferring the script to the server with which communication has been established, (m) receiving and processing the script at the server with which communication has been established, and (n) controlling the processing of the image data by the image processing application according to the result of the processing of the script.

In accordance with the method of reproducing image data in a network projector system of the third embodiment of this invention described above, because the processing of an image and a script is performed on the server side, the effectiveness of processing an image improves, and the cost of the network projector system can be inexpensive.

In accordance with the method of reproducing image data of the second and third embodiments of this invention, script processing can be individually performed, and an image can be effectively and interactively processed and displayed.

In accordance with the method of reproducing image data in a network projector system of the third embodiment of this invention, the step (e) can include a step that processes digital video data and forms the image, and a step that processes image data other than digital video data and forms an image.

Moving pictures and still pictures can be individually processed according to the type of image data, and formation and display of an image can be effectively performed.

Additionally, in order to solve the above problems of the conventional art, a network projector system of the first embodiment of this invention is a network projector system that has at least one server connected to a network, and at least one projector connected to the at least one server through the network.

The at least one server comprises a device that prepares data that includes image data of the image to be reproduced by a projector and image controlling data.

The network comprises:
a device that establishes communication between any projector of the at least one projector and at least one specified server of the at least one server, and
a transfer device that transfers data that includes the image data and the image controlling data from the at least one specified server of the at least one server with which communication has been established to the projector.

The projector with which communication has been established comprises:
a receiving device that receives the data that includes the image data and the image controlling data from the at least one specified server,
a memory medium that stores the data which has been received by the receiving device,
a device that determines image data which is necessary for the image to be displayed based upon the image controlling data,
a device that checks whether the necessary image data is stored in the memory medium,
a device that determines whether there is sufficient empty space in the memory medium to store the necessary image data when the necessary image data is not stored in the memory medium,
a device that detects data that is unnecessary for the image to be displayed, and deletes the unnecessary data from the memory medium when the empty space available in the memory medium is insufficient to store the necessary image data,
an image formation device that processes the image data which has been stored in the memory medium and forms an image, and
a display that displays the image which has been formed by the image formation device.

Furthermore, in order to solve the above problem of the conventional art, a network projector system of the second embodiment of this invention is a network projector system that has at least one server connected to a network, and at least one projector connected to the at least one server through the network.

The at least one server comprises a device that prepares data that includes image data of the image to be reproduced by a projector and image controlling data.

The network comprises:
a device that establishes communication between any projector of the at least one projector, and at least one specified server of the at least server, and
a transfer device that transfers data that includes the image data and the image controlling data from the at least one specified server of the at least one server with which communication has been established to the projector.

The projector with which communication has been established comprises:
a receiving device that receives the data that includes the image data and the image controlling data from the specified server,
a memory medium that stores the data which has been received by the receiving device,
a device that determines image data which is necessary for the image to be displayed based upon the image controlling data,
a device that checks whether the necessary image data is stored in the memory medium,
a device that determines whether there is sufficient empty space available in the memory medium to store the necessary image data when the necessary image data is not stored in the memory medium,
a device that detects data that is unnecessary for the image to be displayed, and deletes the unnecessary data from the memory medium when the empty space available in the memory medium is insufficient to store the necessary image data, an image formation device that processes the image data which has been stored in the memory medium and forms an image, a display that displays the image which has been formed by the image formation device, an event inputting device that inputs an event in connection with the image which has been displayed by the display, a device that generates a script according to the event which has been input by the event inputting device, a device that processes the script which has been generated, and a device that controls the processing of the image data according to the result of the processing of the script.

In the network projector system of the second embodiment of this invention, the image which has been displayed by the image display can include a script, and the event inputting device can input an event in connection with the script.

In the network projector system of the first and second embodiments of this invention, by preparing image data at a server, connecting a projector and a server to a network, processing the image data at the projector, and displaying an image, a PC is not needed at a meeting place, and the image can be easily formed from the image data and displayed without being restricted by the environment. Furthermore, because it is possible to check whether the image data to be reproduced is stored, and to delete unnecessary data from a memory medium, the image data can be downloaded from a server according to the memory capacity, and the memory capacity can be kept small.

Furthermore, in the network projector system of the first and second embodiments described above, the projector can form an image by the image formation device, and the receiving device can receive image data which is necessary for an image to be displayed next from a specified server while the first image is being displayed by the image display.

By downloading the following image data from a server and reproducing the image data while the image is being displayed, it is possible to effectively perform smooth processing without interrupting the display of the image.

In the network projector system described above, the transfer device of the network can transfer data, that includes image data, image controlling data, and an image processing application from a specified server of the at least one server with which communication has been established, to the projector, and the image formation device of the projector can process the image data by the image processing application and form an image.

If an image processing application is prepared at a server, and the image processing application is read along with the image data from the server, it is not necessary to separately provide an application which processes the image data.

In the network projector system described above, the image data, which is received from the specified server by the receiving device of the projector, can include at least one of still picture data, sound data, digital video data, script data, and text data, and the image formation device of the projector can include a device that processes digital video data of the image data, and forms an image, and a device that processes image data other than digital video data and forms an image.

Moving pictures and still pictures can be individually processed according to the type of image data, and formation and display of an image can be effectively performed.

Furthermore, in order to solve the problems of the conventional art described above, a network projector system of the third embodiment of this invention is a network projector system that has at least one server connected to a network, and at least one projector connected to the at least one server through the network.

The network comprises a device that establishes communication between any projector of the at least one projector, and at least one specified server of the at least one server.

The at least one server comprises:

a device that prepares data that includes image data of the image to be reproduced by the projector, image controlling data and an image processing application, a device that determines image data which is necessary for the image to be displayed by the projector based upon the image controlling data, an image formation device that processes the image data which has been determined, by the image processing application of the server with which communication has been established, and forms an image, a transfer device that transfers the image, which has been formed by the image formation device, to the projector, a script processing device that receives a script from the projector and processes the script, and a device that controls the image formation device according to the result from the script processing device.

The projector comprises:

a device that designates an image to be displayed to the server with which communication has been established, a memory medium that stores the image that is transferred from the server with which communication has been established, a device that determines whether there is sufficient area to store the image in the memory medium, a device that detects unnecessary data, and deletes the unnecessary data from the memory medium, when the empty space available to store the image in the memory medium is insufficient, a display that displays the image which has been stored in the memory medium, an event inputting device that inputs an event in connection with the image which has been displayed by the display, and a device that generates a script according to the event which has been input by the event inputting device, and transfers the script to the server with which communication has been established.

In the network projector system of the second and third embodiments of this invention, script processing can be individually performed, and an image can be effectively and interactively processed and displayed.

Furthermore, in the network projector system of the third embodiment described above, the image formation device of the server can also include a device that processes and forms digital video data of the image data, and a device that processes and forms image data other than digital video data.

Moving pictures and still pictures can be individually processed according to the type of image data, and an image can be effectively formed and displayed.

DETAILED DESCRIPTION OF PREFERRED EMBODIMENTS

A method of reproducing image data in the network projector system, and the network projector system, of this invention, will be explained with reference to the drawings.

Figure 1:
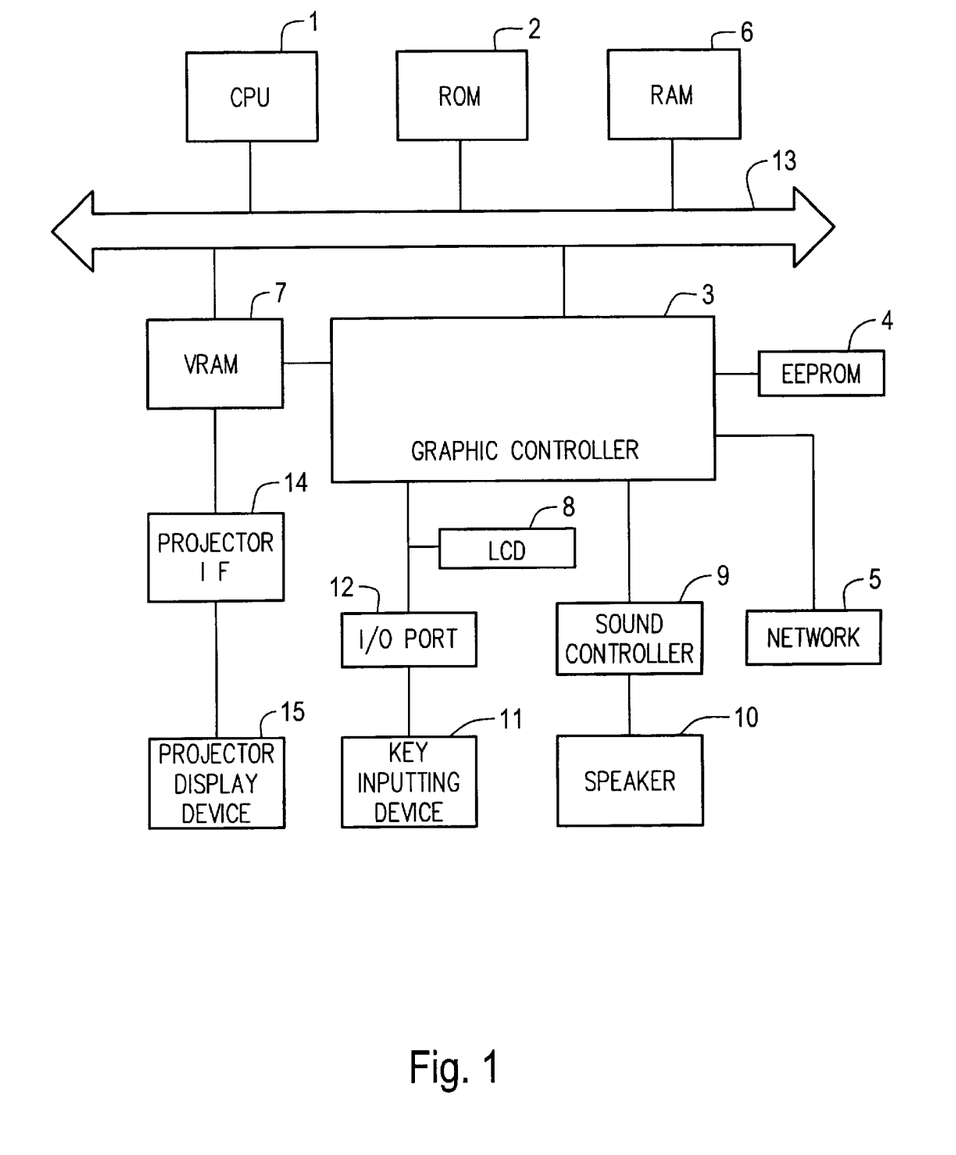
FIG. 1 is a schematic structural diagram showing hardware of a projector of a network projector system in accordance with one embodiment of this invention.

FIG. 1 is a schematic structural diagram showing hardware of a projector in accordance with one embodiment of this invention. In FIG. 1, this projector is provided with a CPU 1 which controls the entire device, a ROM (Read Only Memory) 2 which stores initialization programs, such as IPL (Initial Program Loader) which is used for initialization of the device, a network interface 5 which is connected to an FTP (File Transfer Protocol) server (not shown) having an image processing application which processes image data, a RAM (Random Access Memory) 6 which stores image data or the like that has been downloaded from an HTTP (HyperText Transfer Protocol) Web server (not shown) and the image processing application which has been downloaded through the network interface 5 from the FTP server (not shown), a VRAM (Video RAM) 7 which temporarily stores the processed image data, a speaker 10 which reproduces sound data, a sound controller 9 which controls the speaker 10, a key inputting device 11 which is an external inputting device, an I/O port 12 which receives signals from the key inputting device 11, a liquid crystal display (LCD) 8 which displays characters, symbols, and the like which have been input from the key inputting device 11, a projector display device 15 which displays an image, a projector interface 14 which transfers the image from the VRAM 7 to the projector display device 15, a graphic controller 3 which processes image data from the RAM 6 and controls the VRAM 7, the LCD 8, the sound controller 9, and the I/O port 12, an EEPROM (Electrically Erasable Programmable ROM) 4 which has controlling data and controlling programs to control the graphic controller 3, and a bus 13 which is connected to the CPU 1, the ROM 2, the graphic controller 3, the RAM 6, and the VRAM 7 and transfers data and controlling signals.

Animation, digital videos, still pictures (including text and photos), script, and sound data are included in the image data. Furthermore, moving pictures can be structured by appropriately combining the image data.

Furthermore, as described above, servers, which are connected to the projector, including an FTP server with a reproduction application and an HTTP Web server with image data, are shown. However, the reproduction application and the image data can be provided by the same server computer. Hereafter, in order to simplify the explanation, the FTP server and the HTTP Web server are simply called servers.

Figure 2:
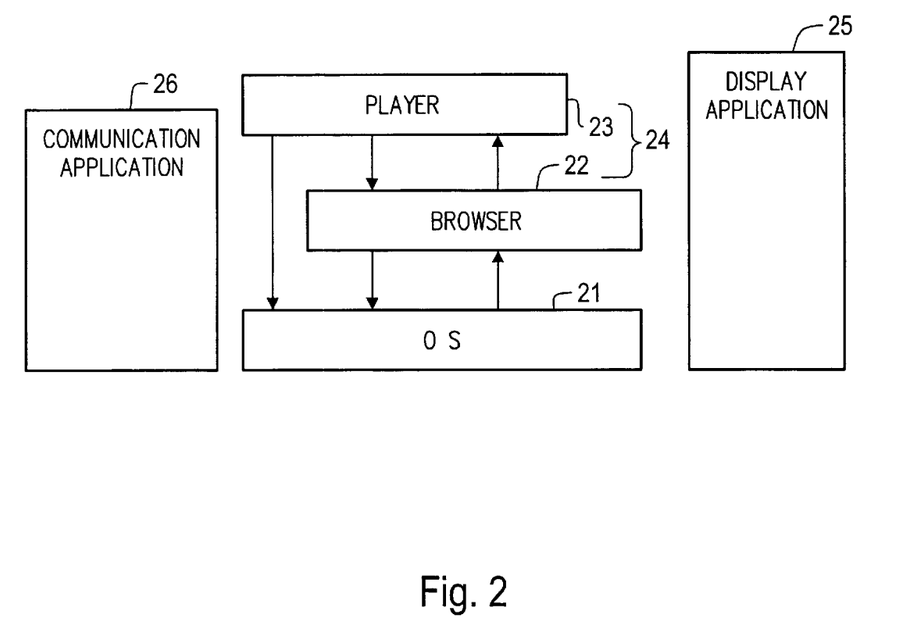
FIG. 2 is a schematic structural diagram showing software which is operated by the projector shown in FIG. 1.

FIG. 2 shows software which functions in the projector of FIG. 1. In this software, an operating system (OS) 21 which controls the entire image processing of the projector, a reproduction application 24 which reproduces image data, a display application 25 which displays an image which has been reproduced by the reproduction application 24, and a communication application 26 which performs sending and receiving of data to and from the server(s) are included. Furthermore, in the reproduction application 24, a browser 22 which processes image data and reproduces still pictures, and a player 23 which processes and reproduces moving pictures of the image data, are also included.

Figure 3:
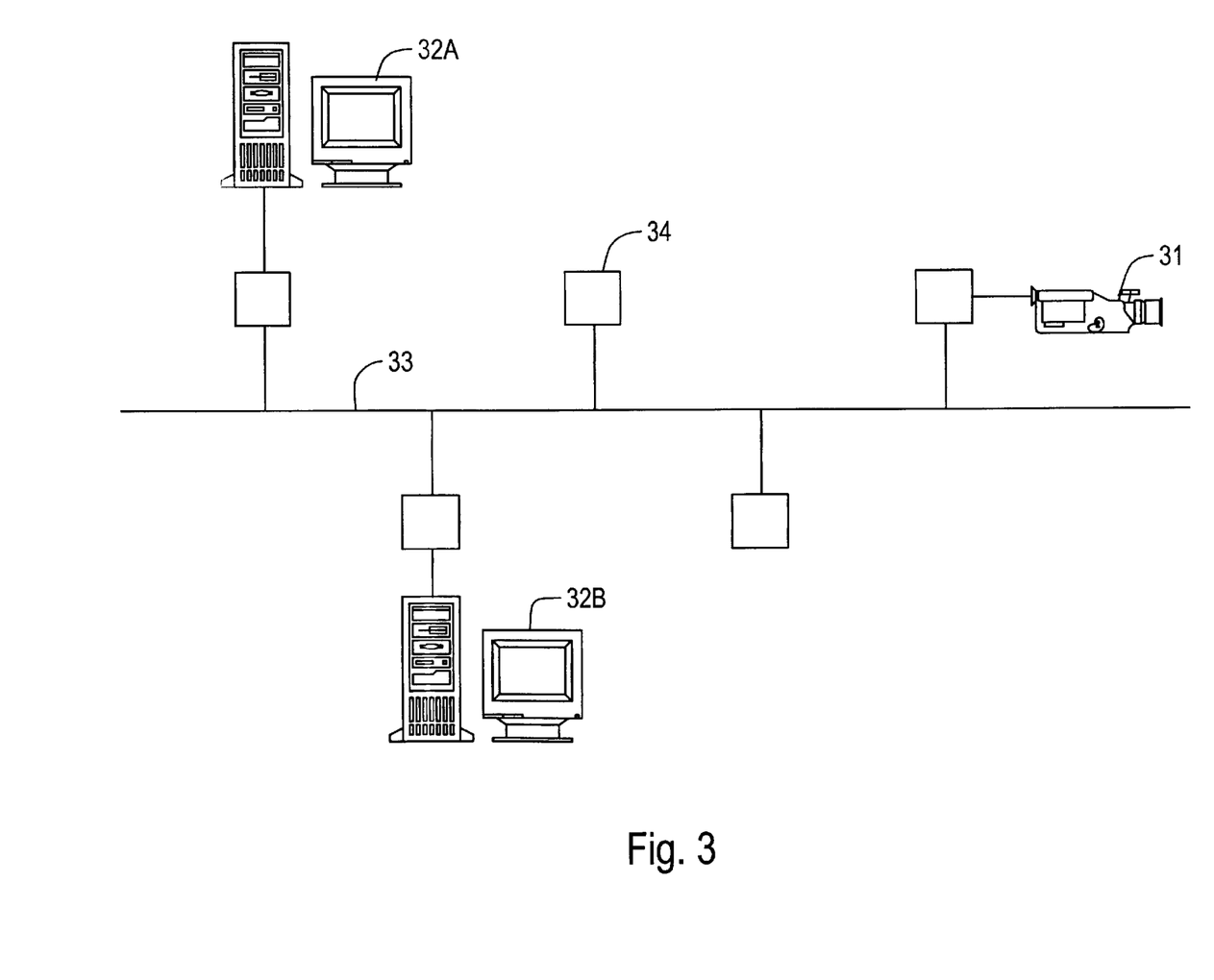
FIG. 3 is a schematic diagram showing one example of an embodiment of a network projector system of this invention in which a projector and a server are connected.

FIG. 3 shows one example of an embodiment of the network projector system of this invention which is connected to the projector and servers. In FIG. 3, the structure of the network is a LAN (Local Area Network) structure, and a projector 31 is connected to a plurality of servers 32A and 32B through a communication cable 33. Connection to the communication cable 33 and terminal devices, such as the projector 31 and the servers 32A and 32B, is performed through a communication connector 34. The communication connector 34 connects terminal devices such as the projector 31 to the LAN, and can be appropriately provided at a necessary location.

FIG. 3 shows a bus type of LAN as a structure of the network, but it is also possible to use a star type of network which uses a hub or the like. Additionally, 10 Base F optical fiber cable, 10 Base 5 or 10 Base 2 coaxial cable, and 10 Base T twisted wire pair cable can be used as the communication cable 33.

Figure 4:
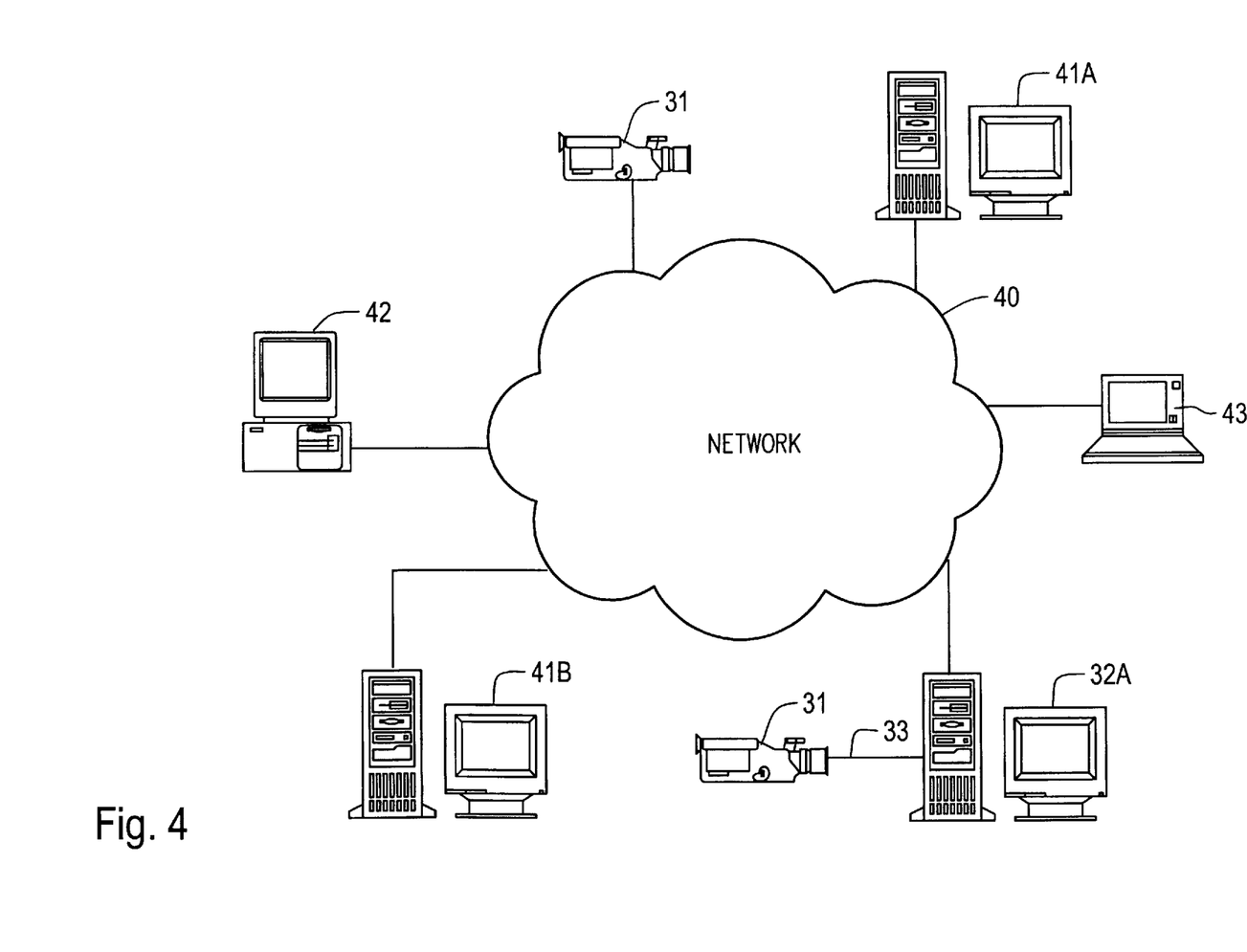
FIG. 4 is a schematic diagram showing one example of an embodiment of a network projector system of this invention in which a projector and a server are connected.

FIG. 4 shows one example of the embodiment of the network projector system of this invention which is connected to a projector and servers. The network 40 shown in FIG. 4 is structured by communication lines. Furthermore, server PCs 32A, 41A, and 41B, a projector 31, and terminal devices 42 and 43, such as PCs, are connected to the network 40. The projector 31 can be directly connected to the network 40, with PCs 41A and 41B as servers, and/or can communicate with server PCs 41A and 41B through another server PC 32A connected to the network 40.

As a method of the network 40 shown in FIG. 4, an open type of network method which can be freely connected to a computer as a rule, based upon a specified communication protocol, and a closed type of network method which manages the network by a host computer or the like, sets limitations such as a certain security over the terminal devices such as a computer to be connected, and does not allow computer nodes outside of the management to connect to the network are available.

As a representative open type network method described above, the Internet can be used. In the Internet, TCP (Transfer Control Protocol)/IP (Internet Protocol) are used. As a rule, if a computer follows this communication protocol, it can be connected to the network. In particular, recently, multimedia environments, such as the WWW (World Wide Web), are provided by using a free network environment, such as the Internet as a background. On the Web, still pictures (text, bitmap images or the like) can be integrated to a Web page. Furthermore, depending upon the application, in the same manner as still pictures, sound and moving pictures can be synchronized and made to function on the same Web page.

Therefore, if the network 40 is the Internet, the communication application 26 of the projector 31 (FIG. 2) can conform with the TCP/IP, and by providing the function of the WWW to the browser 22 (FIG. 2), the projector 31 is connected to the network 40 (Internet), and sending and receiving of data can be performed.

Additionally, the network 40 can be a closed type of network which can be used only for a certain corporation or group. As a closed type of network, from the perspective of the development of the application and the communication protocol which are used for the network, and the perspective of the cost of the maintenance or the like, it can be structured as an intranet by using the communication protocol (TCP/IP) which is used for the Internet and a multimedia-related applications as is.

When the network 40 is thus made to be an intranet, the projector 31 can be structured in the same manner as the Internet described above. In addition, depending upon the type of information (data) which is communicated over the network 40, the data management can be a unified management method which is managed by one server, or a distributed method which is managed by a plurality of servers. Furthermore, both methods can be used for one network 40.

Figure 5:
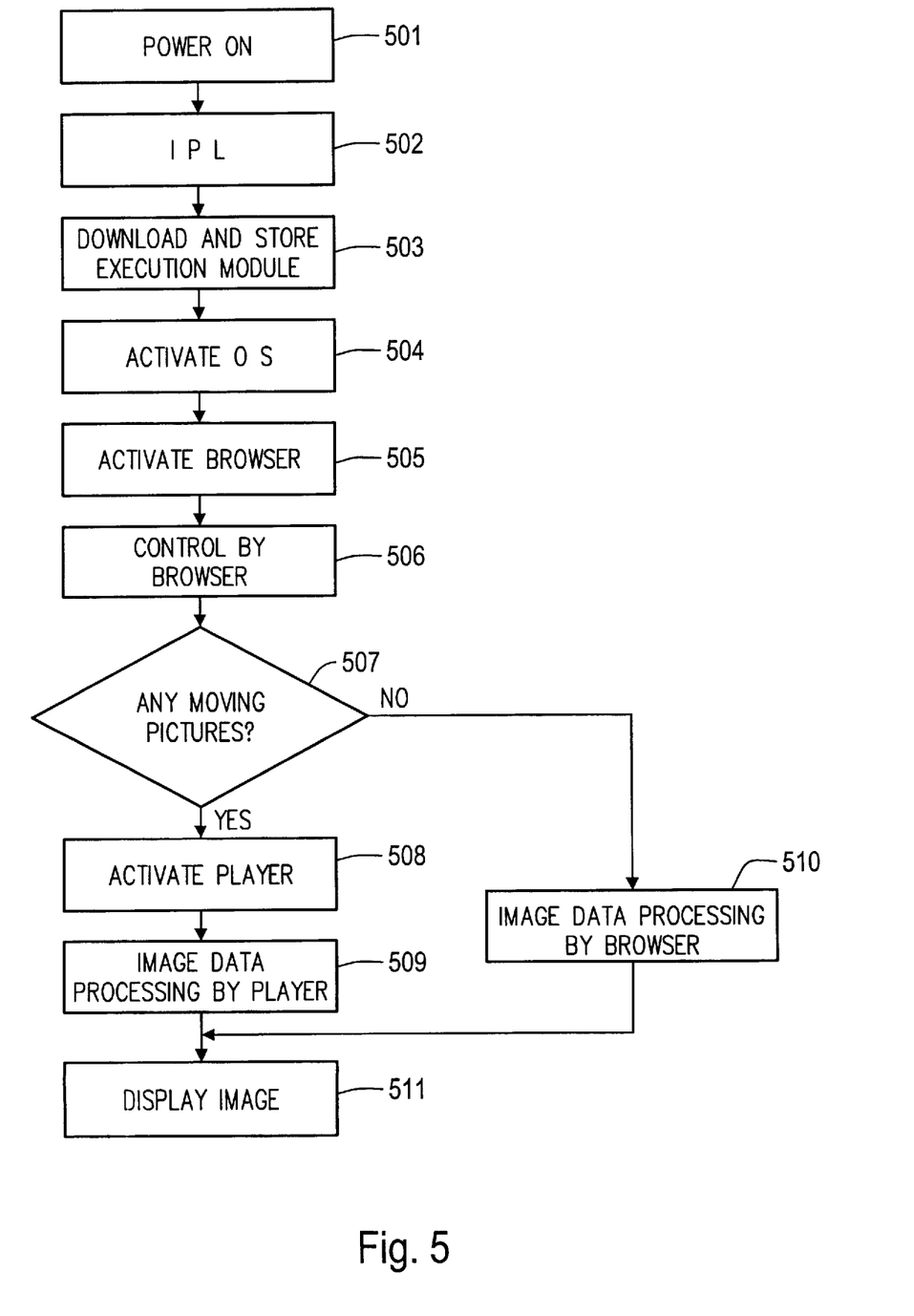
FIG. 5 is a flowchart showing the processing of image data by the projector and software shown in FIGS. 1–4.

A method of displaying an image by the projector shown in FIGS. 1–4 is described below. FIG. 5 is a flowchart that shows the processing of image data by the projector and software shown in FIGS. 1–4. In FIG. 5, when power is turned on to the projector 31 (501), an IPL (Initial Program Loader) is executed (502) by the CPU 1, which calls the initializing program from ROM 2. The communication application 26 functions through this IPL, and execution modules, such as the OS 21, the browser 22, and the player 23, are downloaded from a specified server of the servers (FTP servers) 32A, 32B, 41A, and 41B through the network interface 5, and are stored into the RAM 6 (503). After downloading the execution modules, the OS 21 is activated (504), and the browser 22 is activated by the OS 21 (505).

The browser 22 reads the IP (Internet Protocol) address from the EEPROM 4, under the control of the graphic controller 3, and reads the initial image data, which is data for reproduction, from the HTTP Web server to the RAM 6 by the IP address (506). Here, it is possible to input the IP address from the key inputting device 11 without providing the EEPROM 4 in the projector 31. Through the input IP address, it is possible to select a specified server from a plurality of servers 32A, 32B, 41A, and 41B. Furthermore, depending upon an input signal which has been input from the key inputting device 11 (for example, a function key), it is also possible to read the IP address from the EEPROM 4 after storing a plurality of IP addresses to the EEPROM 4. The IP address, which has been designated by the input or the like, can be confirmed by displaying the address on the LCD 8, and a mistaken input of the IP address can be prevented. By so doing, the safety provided by security can be improved. Additionally, the initial image data can be made into image data of a home page or the like.

The image data stored in the RAM 6 is processed by the graphic controller 3. At this time, in the graphic controller 3, if the image data includes moving pictures, such as animation or digital video (507), the player 23 is activated (508), and the moving pictures are processed by the player 23 (509).

Meanwhile, if the image data does not include moving pictures, such as animation or digital video (507), the image data is processed by the browser 22 in the graphic controller 3 (510).

The image data which has been processed by the browser 22 and/or the player 23 is displayed by the projector display device 15 through the VRAM 7 and the projector interface 14 (511). Furthermore, the sound data is reproduced at the speaker 10 by the sound controller 9.

One embodiment of the method of displaying the image by a projector of this invention is described above. However, in step (502) and step (503), it is possible to initially prepare the execution modules, such as the player 23, the browser 22, and the OS 21, in the projector without downloading the execution modules from a server.

Figure 6:
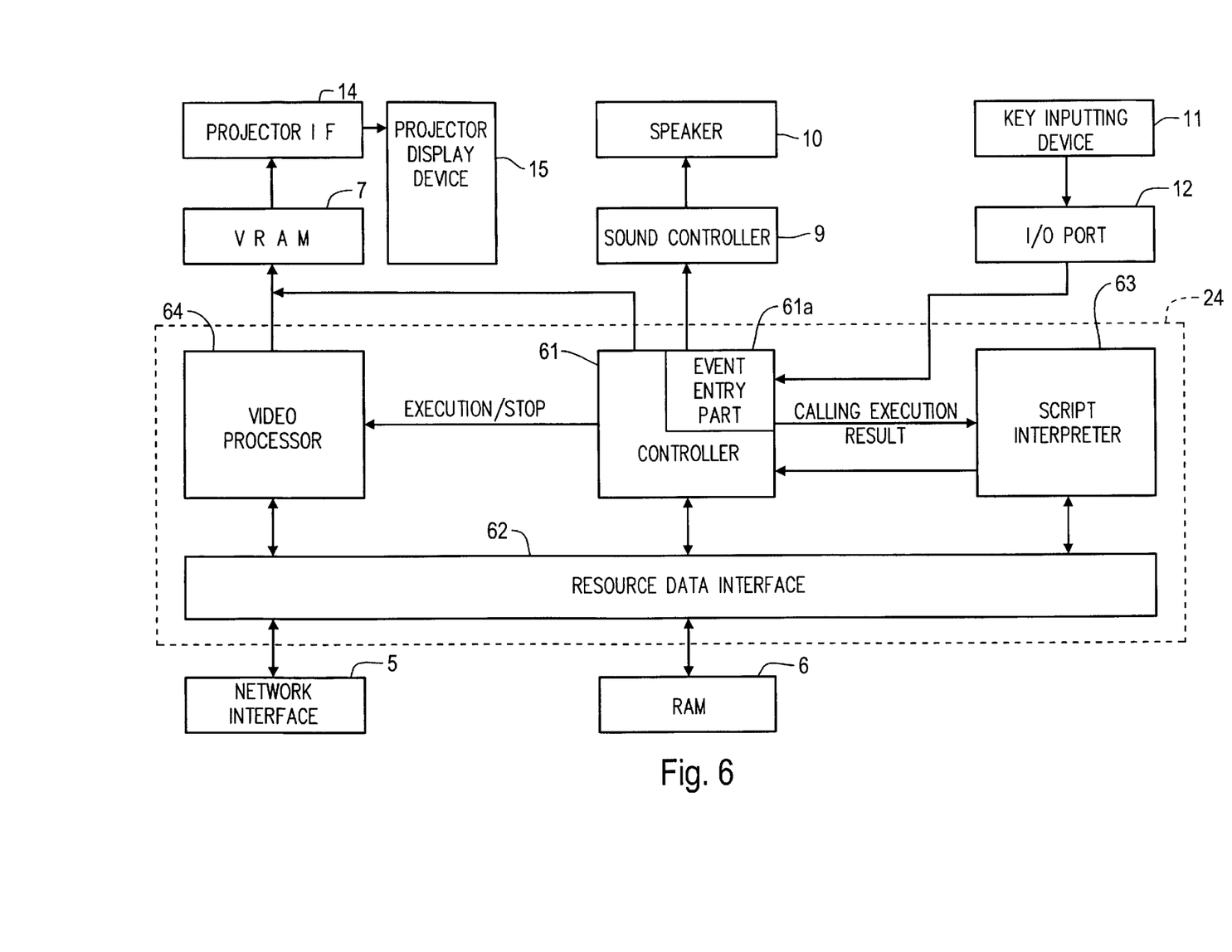
FIG. 6 is a schematic structural diagram showing the structure of a reproduction application.

FIG. 6 is a schematic structural diagram showing a specific structure of the reproduction application 24 which is operated by the projector of this invention. One example of a method of processing image data is specifically explained below with reference to FIG. 6. The reproduction application 24 is connected to a controller 61 which controls the reproduction of the image data, the network interface 5, and the RAM 6, and is provided with a resource data interface 62 which reads and writes image data to/from the server 32 (FIG. 3) and the RAM 6, a script interpreter 63 which processes an interactive script, and a video processor 64 which is connected to the VRAM 7 and processes digital video data.

The controller 61 has an event entry part 61a and is connected to the VRAM 7, the sound controller 9, and the I/O port 12. In the event entry part 61a, an event which performs a typical processing, such as an interruption processing, is registered. An event occurs in response to an input signal which is input from the key inputting device 11 through I/O port 12, and the event is processed in the controller 61.

Here, the input signal from the key inputting device 11 is input interactively with the display image. If the input signal requests script processing, the controller 61 receives the generation of script from the event entry part 61a, calls the script interpreter 63, processes script by the script interpreter 63 and receives the execution result.

In addition, if the data to be processed is digital video data, the controller 61 activates the video processor 64, and reproduces and processes the digital video data through the video processor 64. The controller 61 activates and stops the video processor 64. Part of the data area of the controller 61 is assigned to the data area of the video processor 64. Furthermore, clock timers of the controller 61 and the video processor 64 are independent, and the respective image data processing can be individually performed.

Figure 7:
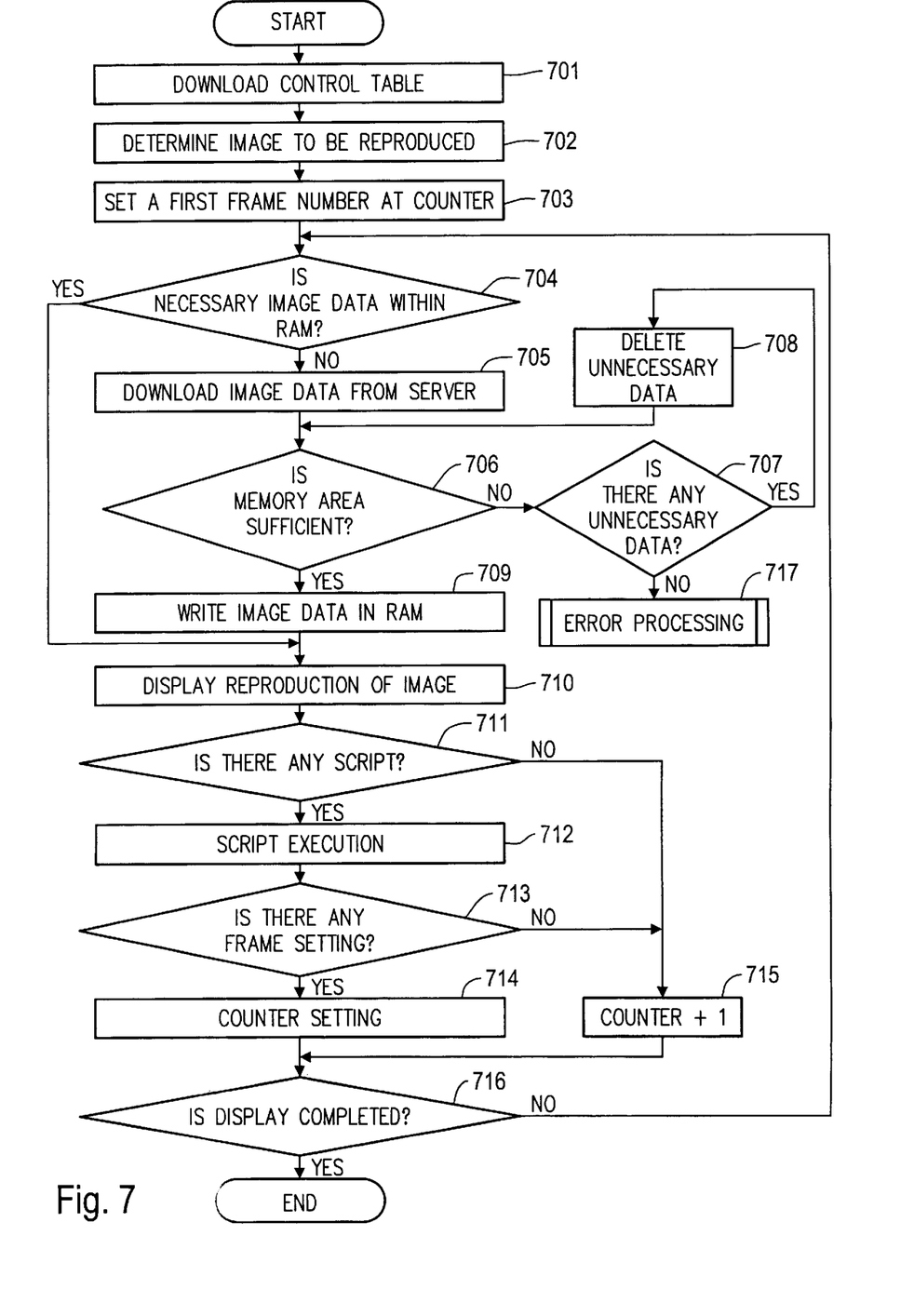
FIG. 7 is a flowchart showing the processing of image data by the reproduction application shown in FIG. 6.

FIG. 7 is a flowchart that shows the processing of image data of the reproduction application 24 shown in FIG. 6. It is assumed that image data is already prepared in a server. One example of creating image data is shown. First, a plurality of still image files, digital video files, and sound files and the like are created, and the content of the respective images is created through these files. By applying frame numbers to a plurality of contents which have been created, the contents can be formatted in a table in accordance with the display order, based upon the frame numbers, and a control table can be created. The control table and the respective image data are stored in a server.

In FIG. 7, first, the controller 61 downloads the control table from a server (701). Next, the image data to-be reproduced is determined (702). This determination can be automatically performed by a program (application), or it can be performed based upon the processing result of the script interpreter 63 in response to the generation of an event from the key inputting device 11. According to the determination of the image data to be reproduced, the first frame number of the necessary image data is set in a frame counter (not shown) (703). Next, the controller 61 checks whether the reproduction image data corresponding to the control table is within the RAM 6 through the resource data interface 62 (704). If there is no image data corresponding to a frame number within the RAM 6, it is determined that the corresponding image data will be downloaded from a specified server through the network interface 5 (705). At this point, the controller 61 does not need to download all of the image data at once, which is needed for reproduction of the image to be displayed, and the image data of a predetermined data amount is downloaded. The data amount to be downloaded can be designed according to the capacity of the RAM 6.

In order to store the image data to be downloaded, the controller 61 checks the capacity of the empty space of the RAM 6 (706). If the capacity of the empty space of the RAM 6 is not sufficient, that is, if it is smaller than the capacity of the image data to be stored, it is checked whether data which is not needed for the reproduction of image data is within the RAM 6, based upon the frame number of the control table (707).

After detecting unnecessary data, the data is deleted from the RAM 6 and an empty space is confirmed in the RAM 6 (708). If unnecessary data is not detected, the reproduction image data is not written into the RAM 6. Therefore, the reproduction processing of the image is stopped by error processing (717).

If sufficient empty space is confirmed in the RAM 6 (706), the controller 61 downloads the image data from a specified server through the resource data interface 62 and writes the image data into the RAM 6 (709).

Next, the controller 61 reads the image data corresponding to the frame number from the RAM 6, and performs reproduction processing (formation and display of image) (710). At this time, the controller 61 processes depend upon the type of the data. If it is sound data, the sound data is transferred to the sound controller 9 and is reproduced by the speaker 10. If it is a still picture or animation data, it is transferred to the VRAM 7. If it is digital video data, the digital video data is processed by the video processor 64, and the digital video data is transferred from the video processor 64 to the VRAM 7. The image of a moving picture, such as digital video, and/or a still picture, such as text, which have been transferred to the VRAM 7, are displayed by the projector display device 15 through the projector interface 14. Furthermore, if a key input occurs from the key inputting device 11 while the image is reproduced, the controller 61 checks whether there is a script corresponding to the event. If there is a script, it is processed by the script interpreter 63, and the execution result is received. The processing corresponding to the result is executed.

When the reproduction of the image data (formation and display of image data) of the frame number set in the frame counter is completed, a frame completion event occurs. If this event requires script processing (711), script processing is performed by the script interpreter 63, and the result is passed to the controller 61 (712). If the result of the script processing designates a new frame number (713), the controller 61 resets the frame counter with the new frame number (714), and the image data reproduction operation is repeated until the display of the entire image is completed (704–716).

Meanwhile, if the frame completion event does not require script processing (711), or if the result of the script processing does not designate a frame number (713), the controller 61 adds 1 to the frame number of the frame counter (715), and the image data reproduction operation is repeated until the reproduction processing is completed (704–716). If a state is reached where there is no image data to be reproduced within the RAM 6 before the image data of the final frame number is reproduced (704), steps 705–709 described above are executed.

Thus, if the image data which is needed for the reproduction of the image is downloaded part by part and is reproduced, formation and display of the image can be effectively performed by less memory capacity (reproduction processing). In particular, if the image to be displayed is a moving picture with a large data amount, the reproduction processing of the image can be effectively performed by less memory capacity.

After reproducing the image data of the last frame number, it is also acceptable to execute a script and repeat the display from the first frame number, or to display a specified image.

Additionally, if the data is an interactive type of script data, the controller 61 instructs the script interpreter 63 to process the data, the execution result is received, and processing corresponding to the result is executed. However, this processing can be performed at a server. For example, if the execution result by the script interpreter 63 is a request of new image data, the controller 61 requests the download of new image data from the server.

As described above, according to the method of reproducing image data in a network projector system, and the network projector system, of this invention, the image reproduction processing is performed by the reproduction application 24, which includes the browser 22 and the player 23. While deleting unnecessary data, image data is downloaded part by part, and the image is reproduced. An interactive script processing of image data is processed by the script interpreter 63, digital video data is processed by the video processor 64, and the reproduction functions are thus divided according to the type of image data. Therefore, it is possible to minimize the capacity of the RAM 6 which stores the OS, the reproduction application, and the image data, and the processing speed of the CPU 1 does not need to be fast. Therefore, the overall size of the projector can be compact, and the cost of the network projector system can be low.

Furthermore, in the method of reproducing image data in the network projector system, and the network projector system, described above, it is also acceptable to provide the reproduction application 24, that includes the browser 22 and the player 23, to the server, perform all the reproduction processing of image data on the server side, transfer the image which has been reproduced to the projector, and display the image through the projector. At this point, on the projector side, the image to be displayed may be designated from an inputting device or the like.

As described above, according to the method of reproducing the image data in the network projector system, and the network projector system, of this invention, image data that includes moving pictures is conveniently processed at low cost, and images can be displayed by a projector without being restricted by the specifications and the environment of a PC.

What is claimed is:

1. A method of reproducing image data in a network projector system that has at least one server connected to a network, and at least one projector connected to the at least one server through the network, the method comprising the steps of:

(a) preparing data that includes image data of an image to be reproduced by the at least one projector and image controlling data at the at least one server;

(b) establishing communication between any projector of the at least one projector and at least one specified server of the at least one server through the network; and (c) transferring the data that includes the image data and the image controlling data from the at least one specified server with which communication has been established to the projector;

wherein processing performed, in the projector which has received the data which has been transferred, comprises the steps of:

(d) determining image data necessary for the image to be displayed based upon the image controlling data;

(e) checking whether the necessary image data is stored on a memory medium;

(f) determining whether there is sufficient empty space available in the memory medium to store the necessary image data if the necessary image data is not stored in the memory medium;

(g) detecting data that is unnecessary for the image to be displayed, and deleting the unnecessary data from the memory medium when the empty space in the memory medium is insufficient to store the necessary image data;

(h) receiving the necessary image data from the specified server;

(i) storing the image data which has been received in the memory medium;

(j) processing the image data which has been stored and forming an image; and (k) displaying the image which has been formed.

2. A method of reproducing image data in a network projector system that has at least one server connected to a network, and at least one projector connected to the at least one server through the network, the method comprising the steps of:

(a) preparing data that includes image data of an image to be reproduced by the at least one projector and image controlling data at the at least one server;

(b) establishing communication between any projector of the at least one projector and at least one specified server of the at least one server through the network;

(c) transferring the data that includes the image data and the image controlling data from the at least one specified server with which communication has been established to the projector;

wherein processing performed in the projector which has received the data which has been transferred, comprises the steps of:

(d) determining image data necessary for the image to be displayed based upon the image controlling data;

(e) checking whether the necessary image data is stored on a memory medium;

(f) determining whether there is sufficient empty space available in the memory medium to store the necessary image data if the necessary image data is not stored on the memory medium;

(g) detecting data that is unnecessary for the image to be displayed, and deleting the unnecessary data from the memory medium when the empty space in the memory medium is insufficient to store the necessary image data;

(h) receiving the necessary image data from the specified server;

(i) storing the image data which has been received in the memory medium;

(j) processing the image data which has been stored and forming an image;

(k) displaying the image which has been formed;

(l) inputting an event in connection with the image which has been displayed;

(m) generating a script according to the event which has been input;

(n) processing the script which has been generated; and (o) controlling the processing of the image data according to the result of the processing of the script.

3. The method of reproducing image data as set forth in claim 2, step (k) including displaying an image that includes a script; and step (l) including inputting an event in connection with the script.

4. The method of reproducing image data as set forth in claim 3, further including the step of processing steps (d) through (i) for an image to be displayed next, while steps (j) and (k) are being performed.

5. The method of reproducing image data as set forth in claim 4, step (c) including transferring data that includes image data, image controlling data, and an image processing application from a specified server of the at least one server with which communication has been established to the projector; and step (j) including processing the image data by the image processing application and forming an image.

6. The method of reproducing image data as set forth in claim 5, further including the step of receiving image data from the server in steps (c) and (h) that includes at least one of still picture data, sound data, digital video data, script data, and text data.

7. The method of reproducing image data as set forth in claim 6, step (j) including the steps of processing the digital video data and forming an image, and processing image data other than the digital video data and forming an image.

8. A method of reproducing image data in a network projector system that has at least one server connected to a network, and at least one projector connected to the at least one server through the network, the method comprising the steps of:

(a) preparing data that includes image data of an image to be reproduced by the at least one projector, image controlling data, and an image processing application at the at least one server;

(b) establishing communication between any projector of the at least one projector and at least one specified server of the at least one server through the network;

(c) designating, from the projector, an image to be displayed to the server with which communication has been established;

(d) determining image data, which is necessary for the image, which has been designated from the projector at the server with which communication has been established, based upon the image controlling data;

(e) processing the image data which has been determined, by the image processing application of the server with which communication has been established, and forming the image;

(f) transferring a reproduced image to the projector from the server with which communication has been established;

(g) determining whether there is sufficient empty space available in a memory medium of the projector to store the image;

(h) detecting unnecessary data and deleting the unnecessary data from the memory medium when the empty space on the memory medium is insufficient to store the image;

(i) storing the image which has been transferred from the server with which communication has been established in the memory medium;

(j) displaying the image which has been stored by the projector;

(k) inputting an event from the projector in connection with the image which has been displayed;

(l) generating a script according to the event which has been input from the projector, and transferring the script to the server with which communication has been established;

(m) receiving and processing the script at the server with which communication has been established; and (n) controlling the processing of the image data by the image processing application according to the result of the processing of the script.

9. The method of reproducing image data as set forth in claim 8, step (e) including the steps of processing digital video data of the image data and forming an image, and processing image data other than digital video data and forming an image.

10. A network projector system that has at least one server connected to a network, and at least one projector connected to the at least one server through the network;

the at least one server comprising:

a device that prepares data that includes image data of the image to be reproduced by a projector and image controlling data;

the network comprising:

a device that establishes communication between any projector of the at least one projector and at least one specified server of the at least one server; and a transfer device that transfers data that includes the image data and the image controlling data from the at least one specified server of the at least one server with which communication has been established to the projector;

the projector with which communication has been established comprising:

a receiving device that receives the data that includes the image data and the image controlling data from the at least one specified server;

a memory medium that stores the data which has been received by the receiving device;

a device that determines image data which is necessary for the image to be displayed based upon the image controlling data;

a device that checks whether the necessary image data is stored in the memory medium;

a device that determines whether there is sufficient empty space in the memory medium to store the necessary image data when the necessary image data is not stored in the memory medium;

a device that detects data that is unnecessary for the image to be displayed, and deletes the unnecessary data from the memory medium when the empty space available in the memory medium is insufficient to store the necessary image data;

an image formation device that processes the image data which has been stored in the memory medium and forms an image; and a display that displays the image which has been formed by the image formation device.

11. A network projector system that has at least one server connected to a network, and at least one projector connected to the at least one server through the network;

the at least one server comprising:

a device that prepares data that includes image data of the image to be reproduced by a projector and image controlling data;

the network comprising:

a device that establishes communication between any projector of the at least one projector, and at least one specified server of the at least one server; and a transfer device that transfers data that includes the image data and the image controlling data from the at least one specified server of the at least one server with which communication has been established to the projector;

the projector with which communication has been established comprising:

a receiving device that receives the data that includes the image data and the image controlling data from the specified server;

a memory medium that stores the data which has been received by the receiving device;

a device that determines image data which is necessary for the image to be displayed based upon the image controlling data;

a device that checks whether the necessary image data is stored in the memory medium;

a device that determines whether there is sufficient empty space available in the memory medium to store the necessary image data when the necessary image data is not stored in the memory medium;

a device that detects data that is unnecessary for the image to be displayed, and deletes the unnecessary data from the memory medium when the empty space available in the memory medium is insufficient to store the necessary image data;

an image formation device that processes the image data which has been stored in the memory medium and forms an image;

a display that displays the image which has been formed by the image formation device;

an event inputting device that inputs an event in connection with the image which has been displayed by the display;

a device that generates a script according to the event which has been input by the event inputting device;

a device that processes the script which has been generated; and a device that controls the processing of the image data according to the result of the processing of the script.

12. The network projector system as set forth in claim 11, the image which has been displayed by the display including a script, and the event inputting device of the projector inputting an event in connection with the script.

13. The network projector system as set forth in claim 12, the projector forming an image by the image formation device, and the receiving device receives image data which is necessary for an image to be displayed next from the specified server while an initial image is being displayed by the image display.

14. The network projector system as set forth in claim 13, the transfer device of the network transferring data that includes image data, image controlling data, and an image processing application from a specified server of the at least one server with which communication has been established to the projector; and the image formation device of the projector processing the image data by the image processing application and forming an image.

15. The network projector system as set forth in claim 14, the image data which is received from the specified server by the receiving device of the projector including at least one of still picture data, sound data, digital video data, script data, and text data.

16. The network projector system as set forth in claim 15, the image formation device of the projector including a device that processes the digital video data and forms an image, and a device that processes image data other than the digital video data and forms an image.

17. A network projector system that has at least one projector connected to a network, and at least one server connected to the at least one server through the network;

the network comprising:

a device that establishes communication between any projector of the at least one projector, and at least one specified server of the at least one server;

the at least one server comprising:

a device that prepares data that includes image data of the image to be reproduced by the projector, image controlling data and an image processing application;

a device that determines image data which is necessary for the image to be displayed by the projector based upon the image controlling data;

an image formation device that processes the image data which has been determined, by the image processing application of the server with which communication has been established, and forms an image;

a transfer device that transfers the image, which has been formed by the image formation device to the projector;

a script processing device that receives a script from the projector and processes the script; and a device that controls the image formation device according to the result from the script processing device;

the projector comprising:

a device that designates an image to be displayed to the server with which communication has been established;

a memory medium that stores the image that is transferred from the server with which communication has been established;

a device that determines whether there is sufficient area to store the image in the memory medium;

a device that detects unnecessary data, and deletes the unnecessary data from the memory medium, when the empty space available to store the image in the memory medium is insufficient;

a display that displays the image which has been stored in the memory medium;

an event inputting device that inputs an event in connection with the image which has been displayed by the display; and a device that generates a script according to the event which has been input by the event inputting device, and transfers the script to the server with which communication has been established.

18. The network projector system as set forth in claim 17, the image formation device of the server including a device that processes digital video data of the image data and forms an image, and a device that processes image data other than digital video data and forms an image.

* * * * *